Sept. 30, 1924. 1,510,199
H. SEIBEL
PNEUMATIC CUSHION FOR HANDLEBARS
Original Filed July 2, 1920
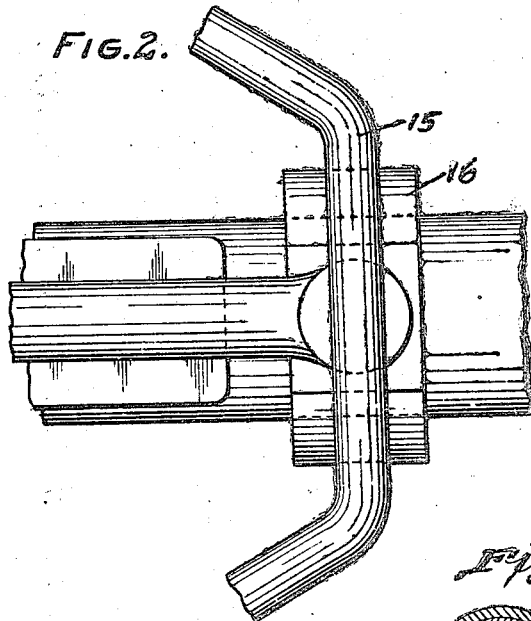
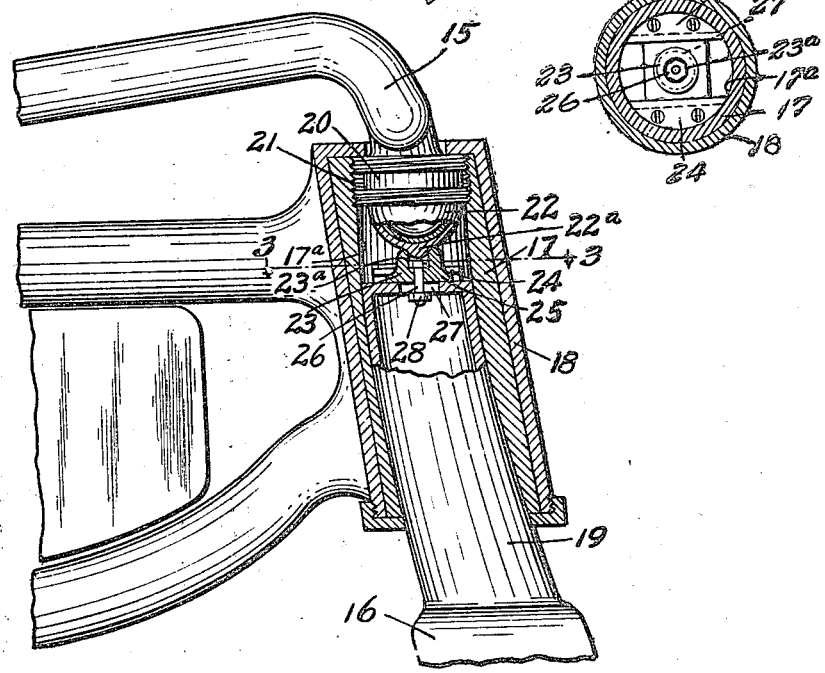
INVENTOR
HENRY SEIBEL
BY Hazard & Miller
ATT'YS.

Patented Sept. 30, 1924.

1,510,199

UNITED STATES PATENT OFFICE.

HENRY SEIBEL, OF SAN FRANCISCO, CALIFORNIA, ASSIGNOR TO UNITED AIR SPRING COMPANY OF ARIZONA, OF PHOENIX, ARIZONA, A CORPORATION OF ARIZONA.

PNEUMATIC CUSHION FOR HANDLEBARS.

Original application filed July 2, 1920, Serial No. 393,554. Divided and this application filed January 11, 1923. Serial No. 611,969.

*To all whom it may concern:*

Be it known that I, HENRY SEIBEL, a citizen of the United States, residing at San Francisco, in the county of San Francisco and State of California, have invented new and useful Improvements in Pneumatic Cushions for Handlebars, of which the following is a specification.

My invention relates to pneumatic supports, and the present application is a division of my co-pending application, Serial No. 393,554, filed July 2, 1920, and which has resulted in Patent No. 1,446,772.

It is a purpose of my invention to provide a pneumatic support adapted for association with a steering mechanism of a vehicle such as the steering fork and handle bars of a motorcycle to effectively absorb shock and vibration and prevent transmission thereof from the steering fork to the handle bars.

It is also a purpose of my invention to provide a pneumatic support including a deformer which is transversely shiftable with relation to its support so that the relatively transverse position of the deformer and the pneumatic element of the pneumatic support will remain unchanged during the lateral shifting of the deformer's support whereby, any wearing action between the deformer and the pneumatic element is prevented.

Although I have herein shown and described only one form of pneumatic support and steering mechanism embodying my invention, it is to be understood that various changes and modifications may be made herein without departing from the spirit of the invention and the spirit and scope of the appended claims.

In the accompanying drawings,

Figure 1 is a view showing in side elevation, and partly in section, a portion of a motorcycle with the handle bars thereof connected to the fork of the front wheel by one form of pneumatic support embodying my invention, Figure 2 is a top plan view of Figure 1.

Fig. 3 is a horizontal sectional detail on the line 3—3 of Fig. 1 and looking downwardly, the view being drawn to show a top plan view of the upper end of the steering post shank and the deformer slidingly or adjustably mounted upon the post.

Referring specifically to the drawings in which similar reference characters refer to similar parts, my invention, in its present embodiment, is shown as applied to the handle bars 15 of a motorcycle, bicycle or the like, and these handle bars are adapted to be flexibly supported relative to the front fork 16 of the motorcycle by the pneumatic support embodying my invention. A supporting sleeve 17 depends from the handle bars at their pivotal axis, and this sleeve is rotatably mounted in the bearing column 18 of the motorcycle frame. The bore of the sleeve 17 is curved longitudinally, as indicated at $17^a$ in Figure 1, and is arranged to receive a similarly curved supporting post 19 of the front fork 16. This post 19 is thus adapted for longitudinal movement within the sleeve 17, the longitudinal curve of the parts being such as to permit of movement of the fork along the natural arc to which it will tend to conform as road shocks and vibrations are imparted to the fork.

The pneumatic support is positioned within the upper end of the bore $17^a$ and between the ends of the post 19 and the sleeve 17. This pneumatic support includes an air reservoir 20 secured within the sleeve 17 by a threaded connection 21. A flexible pneumatic receptacle 22 depends from the reservoir 20 and makes engagement with a deformer 23 mounted upon the upper end of the post 19 so as to be laterally slidably moved relative thereto. This sliding adjustment includes clips 24 engaging shoulders 25 formed upon the deformer, and a bolt 26 extending through a slot 27 and held against displacement by means of a nut 28. A protuberance $22^a$ is formed on the receptacle 22 and is adapted to fit within a socket $23^a$ formed in the deformer 23.

By this arrangement, it will be seen that the handle bars 15 are adapted to turn sleeve 17, which, through the binding engagement provided between the sleeve and the post 19 due to the longitudinal curvature of these parts, will cause turning movement of the front fork of the motorcycle for steering the latter. At the same time, the fork 16 is free for longitudinal movement relative to the handle bars along the curve of its natural arcuate movement, so as to absorb road shocks and vibrations by means of the pneumatic support provided between the fork and the handle bars. The lateral movement of the post 19 relative to the pneumatic support is prevented from causing a similar lateral movement of the deformer 23 relative to the pneumatic receptacle 22, and excessive wear between the pneumatic receptacle and deformer is thus prevented.

What I claim is:

1. A steering member for a vehicle having a flexible support, and a deformer engaging said support, the turnable steering means for a wheel of said vehicle supporting said deformer, with said deformer arranged for lateral movement relative to said support.

2. A steering member for a vehicle having a flexible support, and a deformer engaging said support, the turnable steering means for a wheel of said vehicle supporting said deformer, with said deformer arranged for lateral movement relative to said support, said turnable steering means including an arcuate sleeve received over said steering member to permit of movement of said steering means relative to said steering member responsive to road shocks and vibration while fixing said steering means against rotation relative to said steering member.

3. In combination, a motorcycle frame including a steering fork having a curved post, a curved column receiving the post, handle bars mounted on the column, and means for preventing the transmission of shock and vibration to the handle bars comprising a resilient member and a deformer engaging the member, and means for supporting said means in such manner that relative lateral movement between the resilient member and the deformer is prevented.

4. A steering member for a vehicle having a flexible support, and a deformer engaging said support, the turnable steering means for a wheel of said vehicle supporting said deformer, with said deformer arranged for lateral movement relative to said support, said turnable steering means being arranged for longitudinal movement relative to said steering member and fixed against rotation relative to the same.

5. A steering member for a vehicle having a flexible support and a deformer engaging said support, the turnable steering means for a wheel of said vehicle supporting said deformer, with said deformer arranged for lateral movement relative to said support, said turnable steering means including an arcuate sleeve received over said steering member to permit of movement of said steering means relative to said steering member responsive to road shocks and vibration.

In testimony whereof I have signed my name to this specification.

HENRY SEIBEL.